Patented Feb. 4, 1941

2,230,773

UNITED STATES PATENT OFFICE

2,230,773

PROCESS OF PREPARING SUBSTANCES HAVING THE EFFICACY OF THE CORTICAL HORMONE OR INTERMEDIATE PRODUCTS FOR THE PREPARATION OF SUCH SUBSTANCES

Max Bockmühl, Gustav Ehrhart, and Walter Aumüller, Frankfort-on-the-Main-Hochst, and Heinrich Ruschig, Frankfort-on-the-Main-Unterliederbach, Germany, assignors to Winthrop Chemical Company, Inc., New York, N. Y., a corporation of New York No Drawing. Application March 23, 1939, Serial No. 263,804. In Germany July 5, 1937

6 Claims. (Cl. 260—397)

This application is a continuation-in-part of application Serial No. 216,470, filed June 29, 1938.

That application relates to a process of preparing substances having the efficacy of the cortical hormone or intermediate products for the preparation of such substances. The process chiefly consists in treating with lead tetracetate, a compound of the formula R—CO.CH₃ wherein R stands for a cyclopentanopolyhydrophenanthrene nucleus. The compound mentioned is thus transformed into a compound of the formula R—CO.CH₂.OAc.

Now we have found that the other acylates of the fourvalent lead are likewise suitable to effect the reaction above described. These lead compounds correspond to the general formula Pb(OX)₄ wherein X stands for an acyl radical with more than 2 carbon atoms. Acylates of fourvalent lead are for instance lead tetrabutyrate, lead tetrapropionate, lead tetrapalmitate, lead tetrabenzoate, lead tetraphenylacetate, lead tetratoluylate, lead tetranisate or the like. It is advisable to carry out the reaction at a raised temperature.

As starting materials there may be used the compounds of the following formula

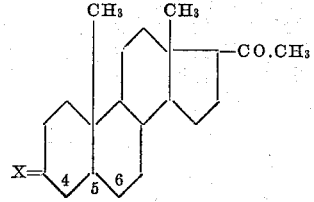

wherein X stands for oxygen or for one of the groupings

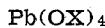

and wherein one double bond exists within the range of the carbon atoms 4, 5 and 6.

It may also be useful to start from compounds of the following formula

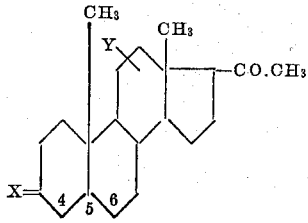

wherein X stands for oxygen or for one of the groupings

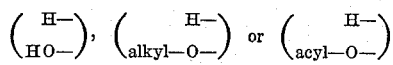

Y stands for an esterified or a non-esterified hydroxyl group and wherein one double bond exists within the range of the carbon atoms 4, 5 and 6.

The process is of particular interest if there are used as starting materials either the progesterone of the formula

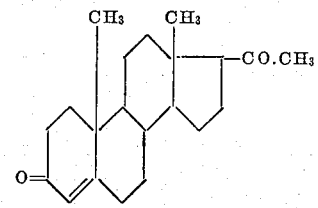

or the acetoxyprogesterone of the formula

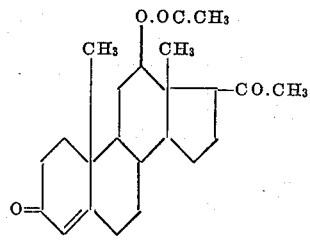

or the pregnenolone of the formula

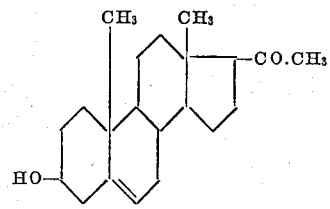

It may be suitable to carry out the reaction in an indifferent solvent or in a medium consisting of the acid which is contained in the lead acylate used, that is to say, for instance, on using lead tetrapropionate the propionic acid or on using lead tetrapalmitate the palmitic acid and so on.

The following examples serve to illustrate the invention, but they are not intended to limit it thereto.

(1) 3.14 grams of progesterone are heated in a reflux apparatus for 24 hours in 50 cc. of dry benzene together with 10.4 grams of lead tetrabenzoate. The benzene solution is thereupon intensively washed with water and dried. It is then evaporated to dryness. The residue amounts to 4.4 grams.

Instead of lead tetrabenzoate there may be used with the same success lead tetraphenylacetate, lead tetratoluylate or lead tetranisate.

(2) 0.42 gram of benzoylpregnenolone (melting at 190° C.) are heated for 24 hours in a reflux apparatus in 20 cc. of benzene together with 1.0 gram of lead tetrabenzoate, and the whole is then further worked up as described in Example 1. The residue reduces ammonical silver solution and Fehling's solution.

(3) 8.25 grams of lead tetrabutyrate are introduced into a solution of 3.14 grams of progesterone in 100 grams of butyric acid and the mixture is maintained for 8 hours at 80° C., while stirring. It is then poured into a large amount of water, the mixture is de-etherified and the ethereal solution is washed until neutral. After drying by way of sodium sulfate the ethereal solution is evaporated to dryness; the residue amounts to about 3.6 grams.

In the same manner progesterone may be transformed into the corresponding ester by means of other lead acylates, for instance, lead tetrapropionate in propionic acid or lead tetrapalmitate in palmitic acid.

We claim:

1. The process which comprises treating a compound of the formula R—CO.CH₃ wherein R stands for a cyclopentanopolyhydrophenanthrene nucleus, the CO.CH₃ group being attached to the 17-carbon atom with a compound of the general formula Pb(OX)₄ wherein X stands for an acyl radical with more than 2 carbon atoms.

2. The process which comprises causing a compound of the formula Pb(OX)₄ wherein X stands for an acyl radical with more than 2 carbon atoms at an elevated temperature to act upon a compound of the following formula

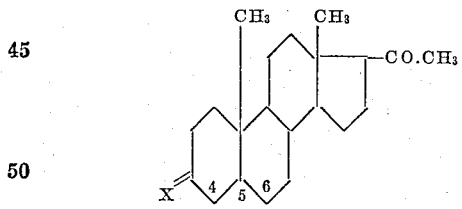

wherein X stands for a member of the group consisting of

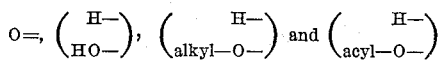

and wherein one double bond exists within the range of the carbon atoms 4, 5 and 6.

3. The process which comprises causing a compound of the formula Pb(OX)₄ wherein X stands for an acyl radical with more than 2 carbon atoms at an elevated temperature to act upon a compound of the following formula

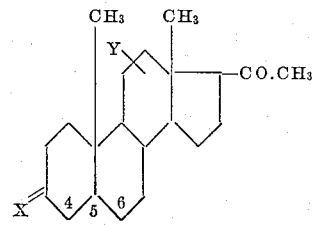

wherein X stands for a member of the group consisting of

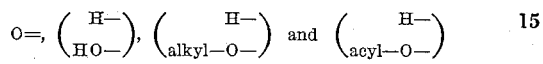

Y stands for a member of the group consisting of hydroxy and esterified hydroxyl groups and wherein one double bond exists within the range of the carbon atoms 4, 5 and 6.

4. The process which comprises causing lead tetrabutyrate at a temperature between about 75° C. and about 85° C. to act upon the compound of the following formula

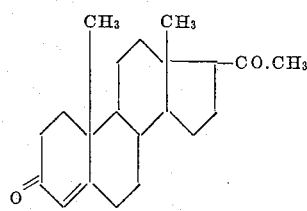

dissolved in butyric acid.

5. The process which comprises causing lead tetrapropionate at a temperature between about 75° C. and about 85° C. to act upon the compound of the following formula

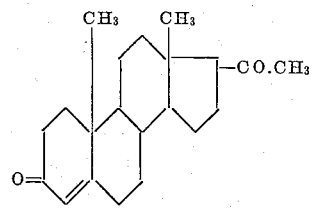

dissolved in propionic acid.

6. The process which comprises causing lead tetrapalmitate at a temperature between about 75° C. and about 85° C. to act upon the compound of the following formula

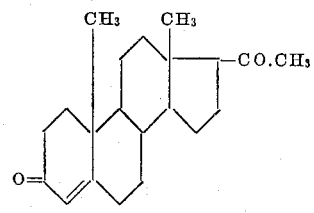

dissolved in an indifferent solvent.

MAX BOCKMÜHL.
GUSTAV EHRHART.
HEINRICH RUSCHIG.
WALTER AUMÜLLER.